(12) United States Patent
Kazmer et al.

(10) Patent No.: US 7,408,551 B1
(45) Date of Patent: Aug. 5, 2008

(54) PERFORMANCE-BASED REPRESENTATION FOR SUPPORT OF MULTIPLE DECISIONS

(75) Inventors: David Kazmer, Amherst, MA (US); Liang Zhu, Amherst, MA (US)

(73) Assignee: University of Massachusetts, Boston, MA (US)

( * ) Notice: Subject to any disclaimer, the term of this patent is extended or adjusted under 35 U.S.C. 154(b) by 1567 days.

(21) Appl. No.: 09/578,108

(22) Filed: May 24, 2000

Related U.S. Application Data

(60) Provisional application No. 60/135,683, filed on May 24, 1999.

(51) Int. Cl.
*G06T 11/20* (2006.01)

(52) U.S. Cl. .................. 345/440; 345/667; 345/636

(58) Field of Classification Search ............... 345/440, 345/441, 418, 502, 636, 667
See application file for complete search history.

(56) References Cited

U.S. PATENT DOCUMENTS

| | | | | |
|---|---|---|---|---|
| 5,287,284 | A * | 2/1994 | Sugino et al. | 700/121 |
| 5,297,057 | A | 3/1994 | Kramer et al. | 364/512 |
| 6,289,299 | B1 * | 9/2001 | Daniel et al. | 345/419 |

OTHER PUBLICATIONS

PS'SOFT Qualiparc "Interfaces" and "Decision Builder", Apr. 2000 (http://www.pssoft.net/q2000.htm).*

IBM TIVOLI, "Automated control of your e-business applications and infrastructure". since 1994, (www.tivoli.com).*

"Tuning Parameters in Engineering Design" by K.N. Otto and E.K. Antonsson, Journal of Mechanical Design, vol. 115, Mar. 1993, pp. 14-19, Pasadena, CA.

"A Compromise Decision Support Problem for Axiomatic and Robust Design" by B. Bras and F. Mistree, Journal of Mechanical Design, vol. 117, Mar. 1995, pp. 10-19, Atlanta, GA.

"Negotiation in Constraint-Based Design" by A. Kusiak, J. Wang and D.W. He, Journal of Mechanical Design, vol. 118, Dec. 1996, pp. 470-477, Iowa City, IA.

"A Designer's Spreadsheet" by R. Ramaswamy and Karl Ulrich, Journal of Mechanical Design, vol. 119, Mar. 1997, pp. 48-56.

Tidd, et al., "Design Refinement via Interactive Manipulation of Design Parameters and Behaviors," Design Theory and Methodology Conference, 1991.

Otto, et al., "Tuning Parameters in Engineering Design," Transactions of ASME, vol. 115, pp. 14-19, Mar. 1993.

* cited by examiner

*Primary Examiner*—J. Amini
(74) *Attorney, Agent, or Firm*—Fish & Richardson P.C.

(57) ABSTRACT

A computer-implemented decision support system provides a performance-based representation using multi-dimensional clipping and transformation algorithms. Three types of supporting information are presented to the decision maker: a function matrix that describes the performance attributes varying with the decision variables; a decision space that illustrates the feasible decision set that meets performance requirements; and, a performance space that provides the feasible performance region displays the Pareto Optimal set.

39 Claims, 15 Drawing Sheets

1. Initialize the loop $lp1 = \{$
       $(LCL_i, LCL_j), (LCL_i, UCL_j),$
       $(UCL_i, UCL_j), (UCL_i, LCL_j), (LCL_i, LCL_j)$
     $\},$
   $k = 1.$ 2. Create the half space $hs$ defined by the specification $k$:
       $hs = \{X \in R^n \mid f_k(X) \geq LSL_k\}.$ For two-side specifications, repeat Step 3–5 for $USL_k$.

3. Set $lp0 = lp1,$
       $v_a = v_1,$ and
       $v_b = v_2.$
   Empty $lp1;$

4. If both $v_a$ and $v_b$ are inside $hs$ then
       add $v_b$ into $lp1;$
     else
       if one of $v_a$ and $v_b$ is inside $hs$ then
           calculate the intersection point $v_c$ of $v_a v_b$ and $hs$
           add $v_c$ into the new loop $lp1$ if $v_b$ is inside $hs$ then
       add $v_b$ into $lp1.$ 5. Set $v_a = v_{a+1}$ and
       $v_b = v_{b+1}.$
   If not all vertices are done, go to step 4.

6. $k = k + 1.$ If $k \leq n,$ go to step 2.

7. Add the first vertex into the end of $lp1$ to finish the loop. The region surrounded by $lp1$ is the feasible space of $x_i$ vs. $x_j$ with other parameters fixed.

FIG. 4

1. Choose $n$ distinctive constraints from all $m$ specifications and $n$ parameter limits;

2. LU decompose $F$ into $L \cdot U$;

3. Constitute one distinctive right-side $Y$ from specifications and parameter limits.

4. Solve $L \cdot U \cdot X = Y$ by forward and back substitution. If the solution $X^*$ satisfies all the specifications, add it into the extreme point list.

5. If all distinct $Y$s have been operated upon, go to next step. Otherwise go to step 3.

6. If all distinct constraint combinations have been operated upon, go to next step. Otherwise go to step 1.

7. All extreme points and the facets are now available. The feasible decision space and performance space can be acquired by projecting the facets into each 2-dimensional viewing pane, though other projections and representations may be beneficial.

8. The boundary of the feasible space in each viewing pane is a convex hull of the extreme points. Graham-scan algorithm can be adopted to retrieve the convex boundary in $O(h\lg(h))$ time where $h$ is the number of all vertices.

FIG. 7

PERFORMANCE-BASED REPRESENTATION FOR SUPPORT OF MULTIPLE DECISIONS

CROSS-REFERENCE TO RELATED APPLICATIONS

This application claims the benefit of the priority date of U.S. Provisional Application 60/135,683 filed on May 24, 1999, the entire contents of which are herein incorporated by reference.

FEDERALLY SPONSORED RESEARCH OR DEVELOPMENT

The U.S. Government may have certain rights in this invention pursuant to NSF Grant No. DMI 9702797 awarded by the National Science Foundation.

FIELD OF INVENTION

The invention relates to the field of decision support systems, and in particular, to systems for visualizing a performance space.

BACKGROUND

The engineering design process can be viewed as the process of attaining specified values of one or more performance attributes by manipulating one or more design variables within limits specified by one or more corresponding constraints. Unfortunately, the number of design variables, the number of constraints, and the often non-linear coupling between constraints and design variables, can become hinder the process of identifying feasible designs.

When faced with design problems of excessive complexity, the logical progression of the engineering design process from the specified values to the optimal values of the design variables is often derailed. Under these circumstances, the designer often resorts to heuristic reasoning and educated guesswork accompanied by computer simulation. In addition to its inefficiency, this iterative engineering design method is not guaranteed to converge to an optimal set of values for the design variables.

SUMMARY

The invention provides a computer-implemented display to enable a designer to visualize the effects of design variables on performance attributes and to interactively control the performance attributes by manipulating the design variables directly on the display.

The computer-implemented display of the invention includes a plurality of control graphs, at least one of which illustrates an effect of a design variable on a first performance attribute. The display also includes a plurality of performance graphs, at least one of which shows a relationship between the first performance attribute, which is shown in the control graph, and a second performance attribute. For ease of visualization the control graphs are arranged to form an array in which each row is associated with a performance attribute and each column is associated with a decision variable.

The computer implemented display further includes a plurality of decision graphs, at least one of which shows a relationship between the first design variable, shown in the control graph, and a second design variable. Optionally, to assist a designer in visualizing the constraints on the design, the decision graph shows the allowed range of values for both design variables.

The computer-implemented display also includes a design interface through which the designer interactively manipulates values of the design variables so as to control the performance attributes. Because of its intuitive nature, the design interface preferably includes an adjustable slider or scroll box in which movement of the scroll box or slider changes the value of the design variable. Alternatively, or in addition to the adjustable slider or scroll box, the design interface can include a text box or field into which the designer can enter a numerical value for the design variable. The text box or field is particularly useful when the value of a design variable needs to be changed by an amount that would require infinitesimal motion of the slider.

The computer-implemented display also includes a processor coupled to both the performance graph and to the decision graph. In response to the designer's manipulation of the design variables, the processor executes instructions for updating the displayed values of performance attributes in the performance graph and the displayed values of decision variables in the decision graph.

Using the computer-implemented display of the invention, a designer can graphically alter values of several design variables and immediately see the effect of those alterations on several performance attributes simultaneously. By examining the graphs, the desgner can intuitively grasp the significance of proposed design changes. In addition, the simultaneous graphical display of design variables and the resulting performance attributes enables the designer to develop an intuition regarding what design parameters are to be changed in order to achieve desired performance attributes. In many cases, there is no unique optimal design and the problem faced by the designer is one of selecting a particular design from a set of Pareto optimal designs. Under such circumstances, the graphical display of the invention provides the designer with the ability to graphically visualize the set of Pareto optimal designs and to select that design that optimizes what the designer considers to be the most important performance attributes.

Other features and advantages of the invention will be apparent from the following detailed description, the accompanying figures, and the appended claims.

BRIEF DESCRIPTION OF THE FIGURES

FIG. 4 is a flow chart illustrating an algorithm for evaluating the local decision space of FIG. 2.

FIG. 7 is a flow-chart illustrating an algorithm for determining the boundary of the feasible performance space of FIG. 6.

DESCRIPTION

For most engineering problems, the objective of the design process is to find a feasible solution which satisfies customer needs. Based on the complexity of the problem, the solution is also expected to exhibit a reasonable trade-off between performance, unit cost, and development time. Unfortunately, multiple performance attributes are closely coupled in most applications, obstructing the explicit expression of the design objective function. In other words, no single-step optimization can universally assure the satisfactions of all performance attributes. To address this difficulty, the invention provides for a design representation to interactively aid the designer in managing design parameters and performance attributes throughout the design process.

Figure 1:
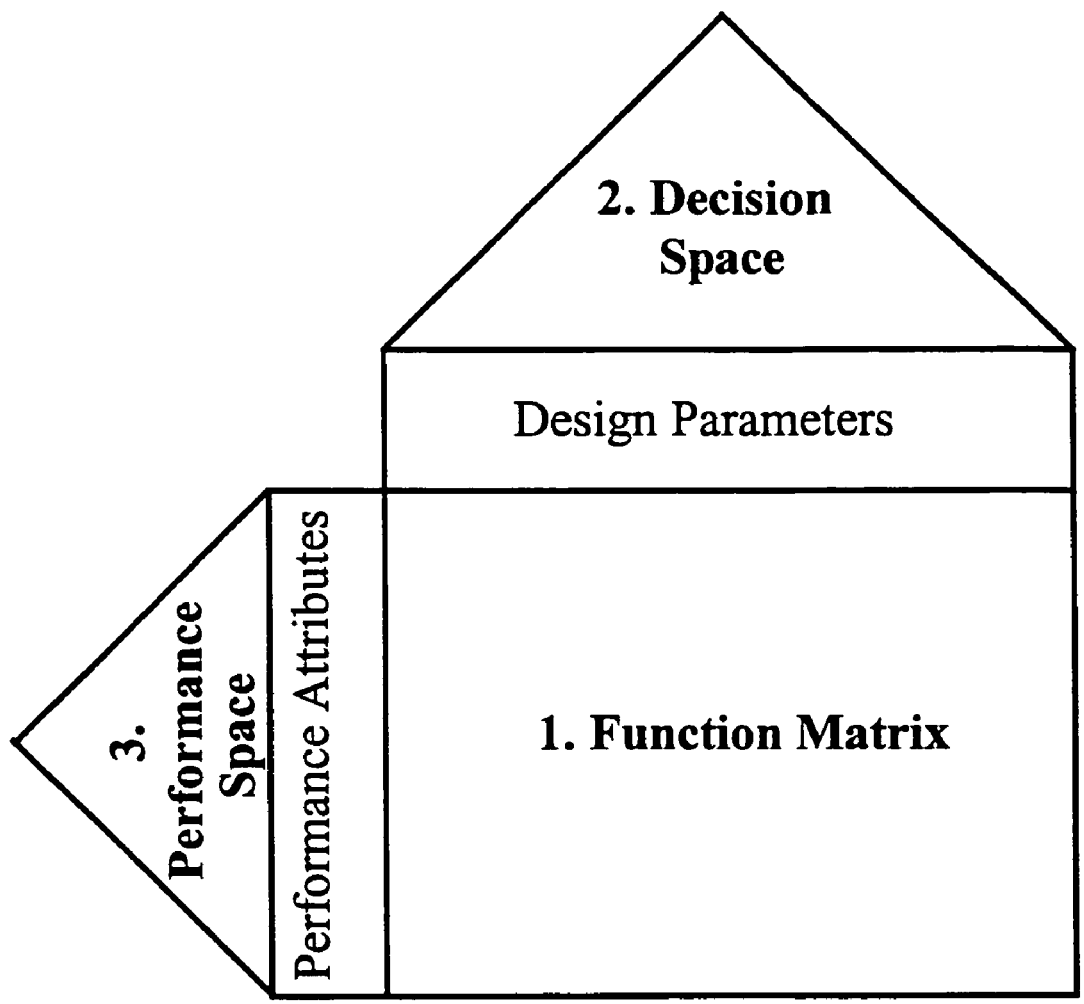
FIG. 1 is a schematic illustration of the display of the invention.

The three main components of the performance-based representation are shown in FIG. 1. While the function matrix represents the system relations between design parameters and performance attributes, the decision space and performance space further explicate the mutual relations between design parameters and performance attributes, respectively. Together these three components provide a full constraint based model of the design feasibility.

Function Matrix

Each well-defined design objective is one performance attribute. The set of performance attributes, together with the expected satisfaction limits constitutes a specification. Denoting the $i^{th}$ performance attribute as $y_i$, a typical specification can be expressed as $LSL_i \leq y_i \leq USL_i$ where $LSL_i$ and $USL_i$ denote the lower and upper specification limits for performance attribute $y_i$. Without loss of generality, a one-sided specification can be formed by substituting $-\infty$ or $+\infty$ for the unspecified limits.

Figure 2:
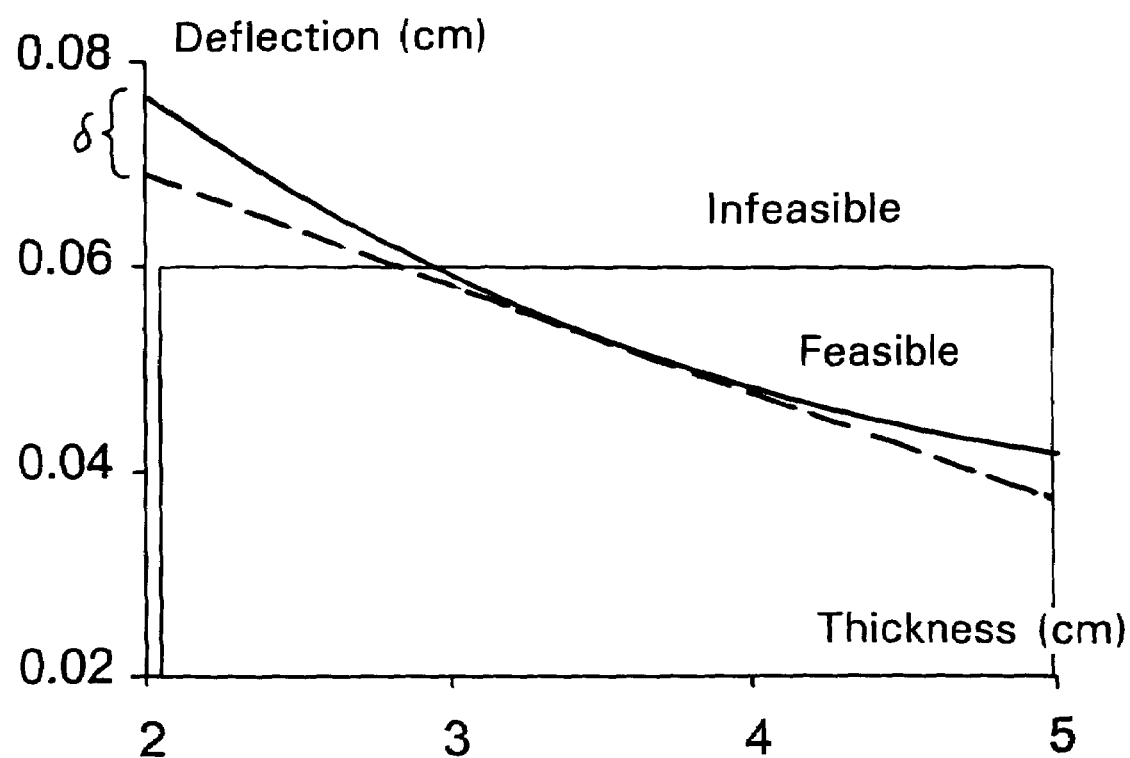
FIG. 2 is a graph showing the error associated with linearizing the dependency of a performance attribute on a design variable.

Suppose $y_i = f_i(X)$, where X is the design vector, $X = \{x_1, x_2, \ldots, x_j, \ldots, x_n\}$ and $LCL_j \leq x_j \leq UCL_j$. By holding design parameters other than $x_j$ constant, the sensitivity $y_i = f_i(x_1^c, x_2^c, \ldots, x_j, \ldots, x_n^c)$ can be plotted, as shown in FIG. 2. To ease the computational burden, the function is linearized to acquire the analytical feasible decision space and performance space. However, the method and system of the invention are equally applicable for non-linear functions.

FIG. 2 shows that an error exists when the linear approximation of the performance attribute function (dashed line) replaces the actual, non-linear function. The estimation error δ can be assessed by the line:

$$\delta = f_i(X) - \left[ f_i(X^C) + \left.\frac{\partial f_i}{\partial x_j}\right|_{X=X^C} \cdot (x_j - x_j^C) \right]$$

Depending on the complexity of the problem and the controlled range of the design parameter, the estimation error may vary significantly. In a situation like FIG. 2, the relative estimation error is less than 10%, which may be acceptable in some engineering problems.

As such, the graphical matrix of the design sensitivity is equivalent to the Jacobian determinant, J:

$$J = \left\{ \begin{array}{cccc} \frac{\partial f_1}{\partial x_1} & \frac{\partial f_1}{\partial x_2} & \cdots & \frac{\partial f_1}{\partial x_n} \\ \frac{\partial f_2}{\partial x_1} & \frac{\partial f_2}{\partial x_2} & \cdots & \frac{\partial f_2}{\partial x_n} \\ \cdots & \cdots & \cdots & \cdots \\ \frac{\partial f_m}{\partial x_1} & \frac{\partial f_m}{\partial x_2} & \cdots & \frac{\partial f_m}{\partial x_n} \end{array} \right\}_{X=X^C}$$

where $X^C$ is the current design vector. This Jacobian may be derived from analytic functions, numerical simulation, or response surface methods utilizing functional evaluation.

Decision Space

The decision space illustrates the feasible regions for all design parameters within which the specifications are satisfied. Suppose that each specification limit (LSL is used without loss of generality because the corresponding analysis for USL is similar) is a hyper-face hf.

$hf = \{X \in R^n | f(X) = LSL\}$, where $R^n$ is an N-dimensional Euclidean space. Therefore, a specification is the half-space hs defined by the hyper-face hf, such that $hs = \{X \in R^n | f(X) \geq LSL\}$.

As such, the decision space is composed of the intersection of all specification half-spaces.

To show the hyper-dimensional decision space, the described representation utilizes a set of viewing panes, each of which corresponds to one mutual relation of design parameters. Therefore, an N-dimensional space can be substituted by (N−1)(N/2)2-dimensional panes. Each 2-dimensional space can be further simplified by fixing the other parameters at the constant level $X^C$. As such, the specification can be plotted in the design space, as shown in FIG. 3.

A half space that is flat around the feasible region indicates the feasibility of linearizing the problem. In the linear model, every point in the feasible space must be on one side of any straight boundary. As a result, the feasible space defines a convex region. Such a convex region can be represented by a circular sequence of vertices $\{v_1, v_2, \ldots, v_n, v_1\}$. As a result of the convexity of the feasible region, one is assured of enclosing the feasible space by connecting the extreme points. In the case of $x_i$ vs. $x_j$ with other parameters fixed, the decision space is solved by a clipping algorithm shown in FIG. 4.

Figure 3:
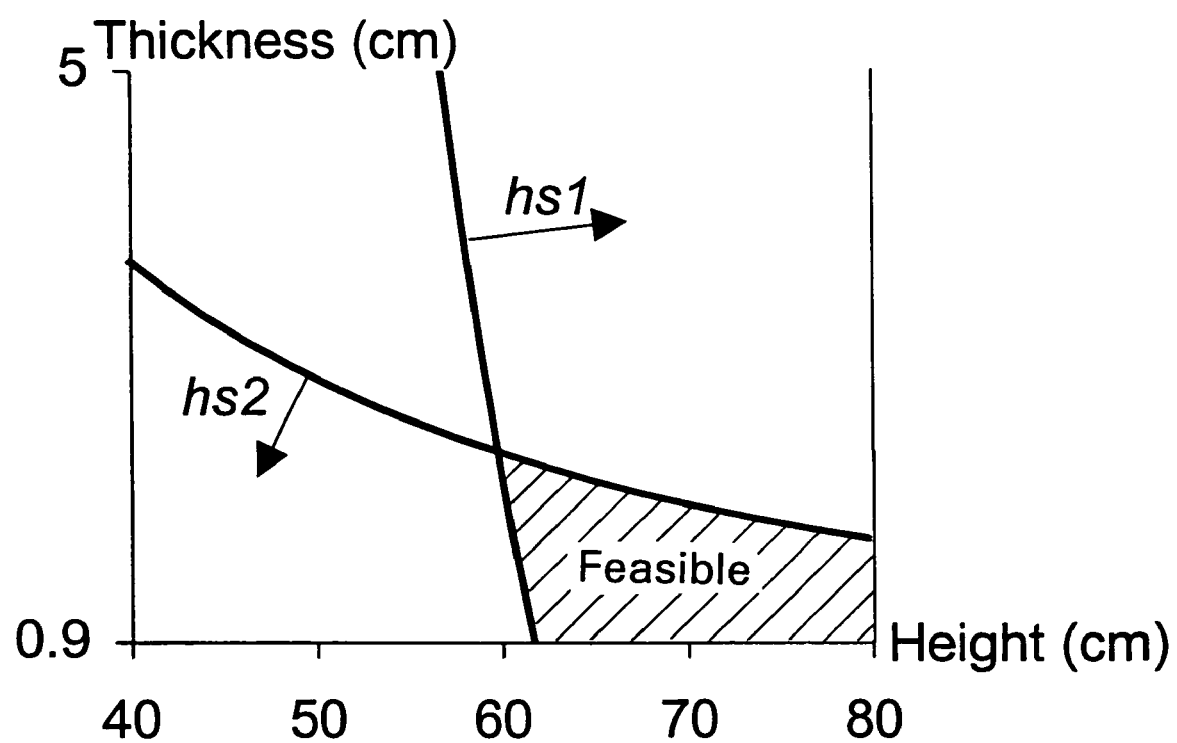
FIG. 3 is a graph showing that portion of a feasible region, formed by two half spaces, that lies in a subspace spanned by two decision variables.

Referring now to FIG. 3, the algorithm works in parallel for each decision graph in the decision space. Because each specification hs intersects the convex decision space at most twice, m specifications cost no more than 2 m intersection calculations. Therefore, it requires O(m) time to solve the feasible region in the decision graph of FIG. 7.

Figure 5:
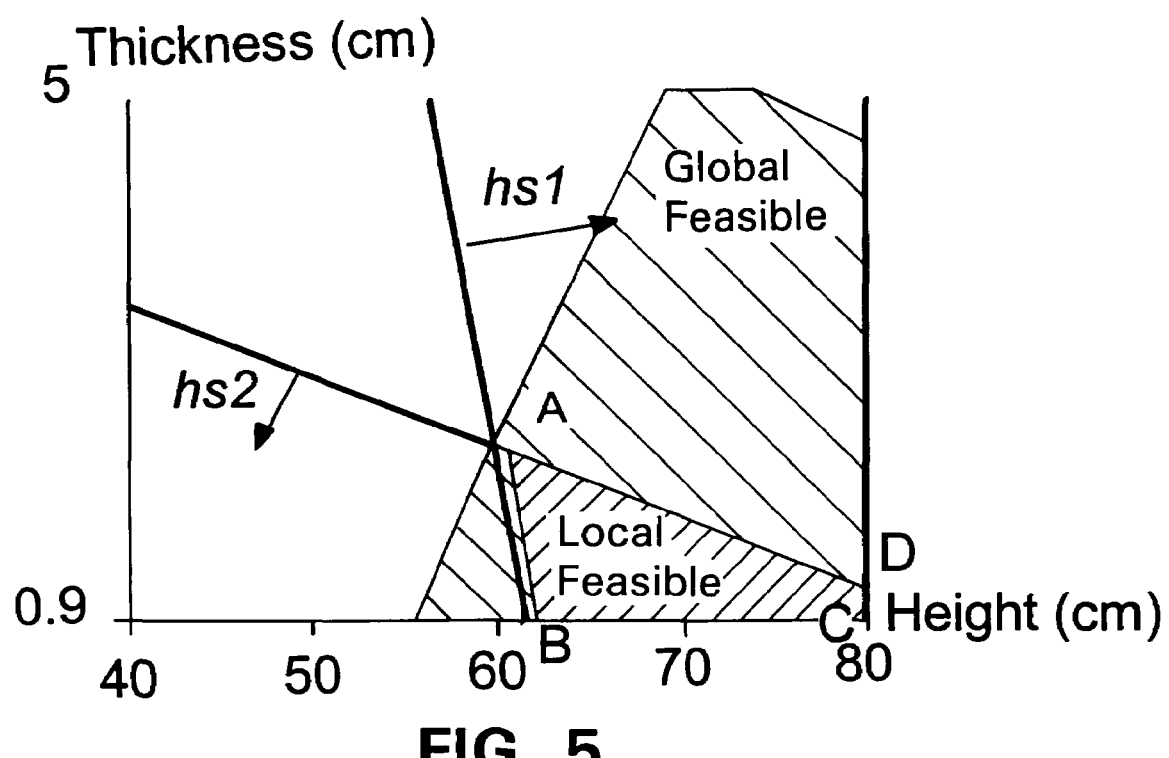
FIG. 5 is a graph showing the feasible region of FIG. 3 following linearization of its boundaries.

According to the algorithm in FIG. 4, the problem in FIG. 3 is solved again as FIG. 5. It is noted that the local decision space is acquired by fixing the other design parameters. Thus, the modification of other parameters will change this feasible region. All local decision spaces under different parameter configurations unite the global decision space. Since the global decision space is closely associated with the concept of the performance space, the algorithm will be discussed subsequently.

Given the local decision space, the designer can adjust the design parameters to select feasible and preferred decisions. The benefit of this data visualization, however, is not evident until the facility of the performance attributes from the design modification is provided. As such, the third key component of the representation, the performance space is presented next.

Performance Space

Figure 6:
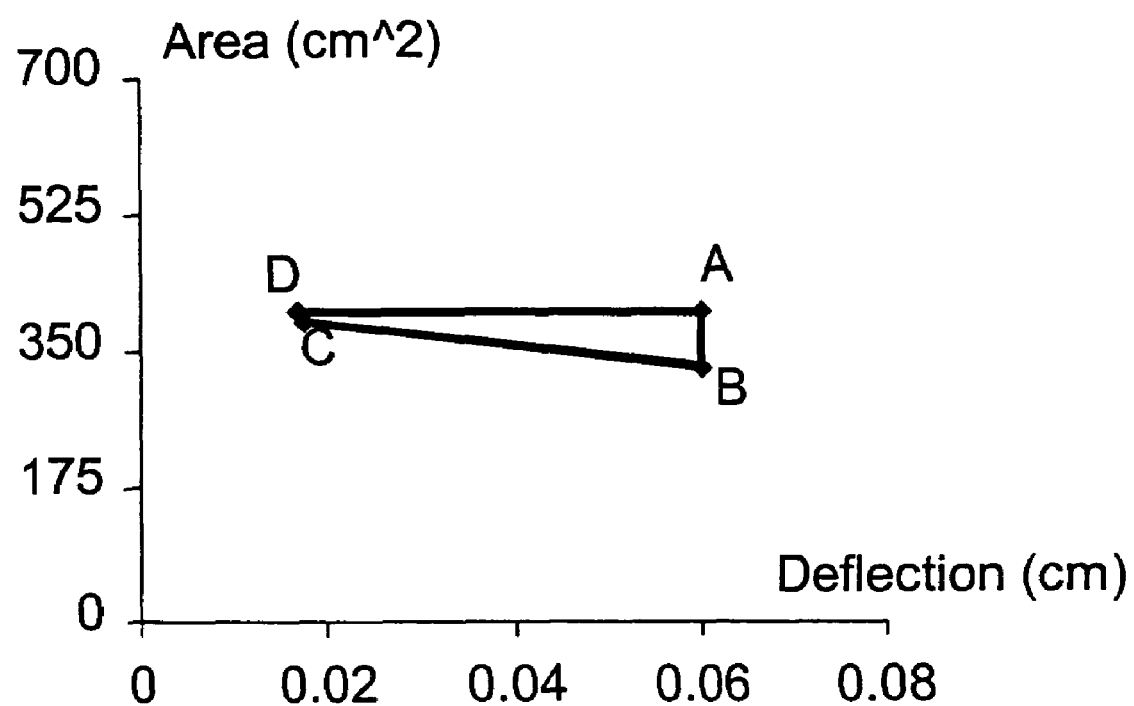
FIG. 6 is a graph showing that portion of the feasible performance space corresponding to the decision space of FIG. 3 lying in a performance subspace spanned by two performance attributes.

The local decision space evaluates the specific design vector and assesses the feasible space based on the given specifications. Similarly, the performance space can be visualized as a set of mutual pairings. Consider a simple problem having two performance attributes ($y_1$=cross sectional area, $y_2$=vertical deflection) and two design parameters ($x_1$=height, $x_1$=middle-thickness). According to the linear performance functions (available in the subsequent case study), the extreme points in the decision space are correspondently mapped to the performance space. Since the linear problem is convex, the feasible performance space is also a convex hull constituted by the mapped extreme points. Utilizing the decision space from FIG. 5, the resulting performance space is shown in FIG. 6.

The performance space illustrates the feasible region and potential trade-offs between two performance attributes. Suppose that a smaller area and a lesser deflection are preferred. As the design moves from A to B in FIG. 6, the area decreases while the deflection remains constant. This decision is trivially accepted by every designer. However, the decision to move the performance from B to C is not as agreeable as the decision to move from A to B. In this case, the desirable deflection decrease comes at a cost of an undesirable area increase. Sometimes, a designer can apply a weighting coefficient for different performance attributes. However, the independent formation, generation, and validation of multiple performance utilities is difficult. In the system of the invention, the designer, aided by the explicit design representation, makes tradeoffs of multiple performance attributes during the interactive design process.

The method and system of the invention are extensible to m performance attributes and n design parameters. Let the performance attributes $Y^*=\{y_1^*, y_2^*, \ldots, y_m^*\} \in S$, where S is the total performance space, $\{Y \in R^m | LSL \leq Y \leq USL, LCL \leq X \leq UCL, Y=f(X)\}$. $Y^*$ is defined as Pareto optimal (non-inferior) if and only if there exists no other $Y'=(y_1', y_2', \ldots, y_m') \in S$, where $Y' \neq Y^*$, such that $y_j' \leq y_j^* \forall j$ (without loss of generality, the smaller value of the performances is assumed to be better). Therefore, the boundary BCD of FIG. 6 is the Pareto Optimal set. Any element in the Pareto Optimal set represents one "optimal" design vector. The term "optimal" here means that there is no way to improve the performance of one attribute without causing a decrease in the performance attribute.

The convex property of the linear problem significantly simplifies the solution of the feasible space. Based on the convexity, the decision space and the performance space are the convex hulls of the same extreme points in two different spaces. Therefore, the first critical step is to find these extreme points. This can be done by solving the system equations composed of n design constraints. Every combination of n constraints from the specification and the parameter limits corresponds to a potential extreme point. The confirmation of this intersection point comes from the feasibility validation of the solution. Any valid intersection point of n constraints is one extreme point of the feasible design space. After all extreme points are acquired, a convex hull algorithm can be applied to each decision graph in the decision space and each performance graph in the performance space. Alternatively, the extreme points can be traced to find the facet of the feasible polytope. Each facet represents one specification or parameter limit. The linear system of equations F·X=Y can be solved by LU decomposition. Given the fact that there are $2^n$ system equations sharing the same coefficient matrix F but different vectors Y, the LU decomposition, shown in FIG. 5A, reduces the computation time.

Like most practical problems, the exploration of all feasible space is a high-order polynomial, or NP, problem. Assuming that the decomposition of F into L·U is the major consumer of computation time, the constraint combinations dominate the polynomial order of the total time. However, the LU decomposition adopted in the algorithm has decreased the number of the linear system equations from $C_{2n+2m}^n$ to $C_{n+m}^n$. When the dimensionality of the problem is under 10, a typical personal computer can derive the performance space in a few minutes. Moreover, the LU decomposition is performed only once for a given design problem and does not impede the interactive investigation of decision variables.

Figure 8:
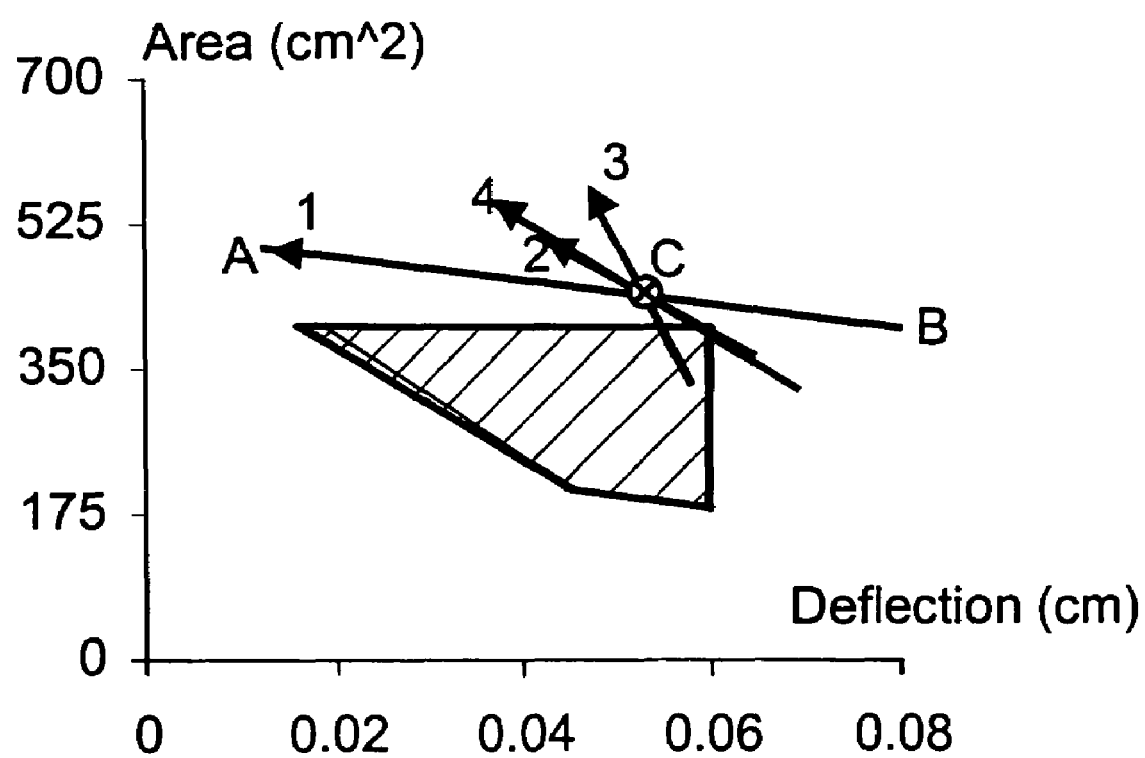
FIG. 8 is a graph showing the motion in the performance space of FIG. 6 corresponding to changes in values of the decision variables.

Given the feasible performance space, a design sensitivity vector for each design parameter can be dynamically shown in a 2-dimensional design space. FIG. 8 illustrates how the design parameters may affect the performance, where the line AB is determined through the point C as:

$$A=\{(y_1,y_2) \in R^2 | y_1=f_1(UCL_1,\overline{x_1}^C), y_2=f_2(UCL_1,\overline{x_1}^C)\},$$

$$B=\{(y_1,y_2) \in R^2 | y_1=f_1(LCL_1,\overline{x_1}^C), y_2=f_2(LCL_1,\overline{x_1}^C)\},$$

Similarly, the designer can formulate the design sensitivity vectors of other parameters. Combined with the Pareto Optimal concept, the designer can adjust the design parameters to the desirable values. While the performance space indicates the target design, the design sensitivity vector indicates how to get there. It is noted that the performance space in FIG. 8, in which all four design parameters are changeable, is different from that in FIG. 6, in which only two design parameters are changeable. Therefore the performance space of FIG. 6 is a subset of the performance space in FIG. 8. The point C represents the current design vector, which is located outside the shadowed feasible performance space. According to the decision variables labeled as 1, 2, 3, and 4, one alternative is to decrease the thickness $x_3$.

EXAMPLE

Figure 9:
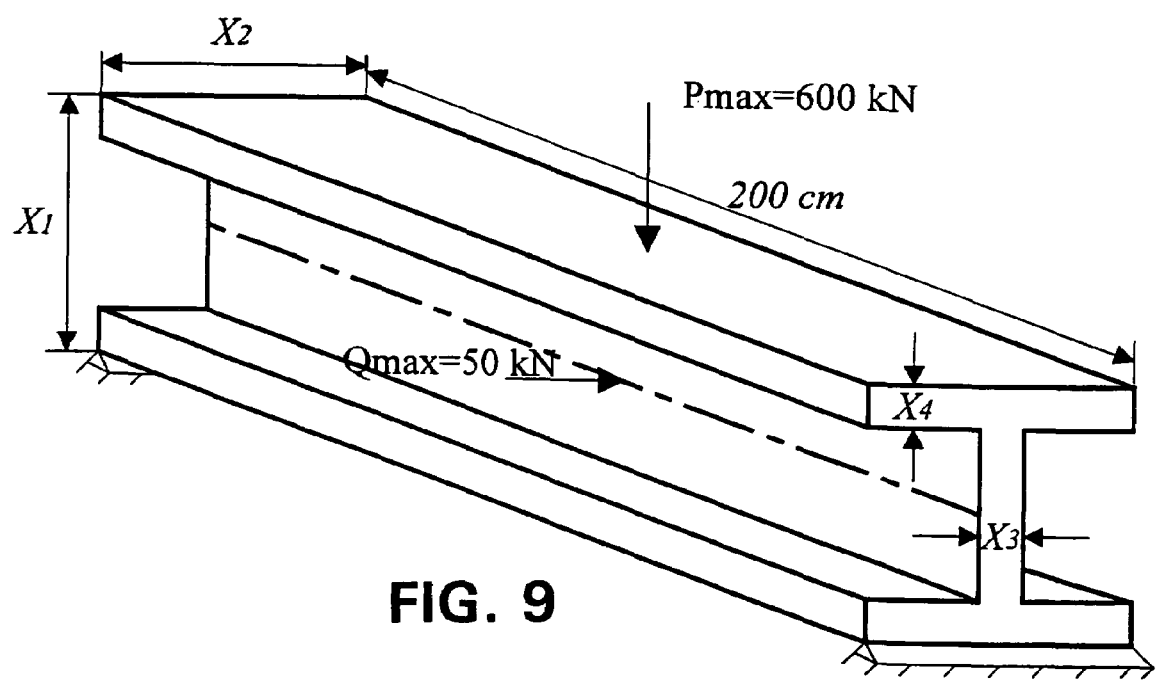
FIG. 9 is a graph showing a beam discussed in connection with the an example application of the display system of the invention.

Beam design has been widely used as an engineering problem to demonstrate multiattribute design methods. A schematic picture of a beam structure and its design parameters are given in FIG. 9. This application is part of an airframe design with the cyclic loading P and Q. Assuming that Aluminum 2024-T3 is used, the permissible maximum stress of the material corresponding to 107 cycles, (per, equals 124

MPa, and its Young's Modulus, E, equals 72.4 GPa. The optimal solution will now be solved with constraint based reasoning and decision based design approaches utilizing the performance-based representation.

Constraint Based Reasoning

Three attributes, cross section area $y_1$, static deflection $y_2$, and maximum stress $y_3$ are specified to measure the overall performance. The performance attributes can be formulated as:

$$y_1 = f_1(X) = 2x_2x_4 + x_3(x_1 - 2x_4)$$

$$y_2 = f_2(X)$$
$$= PL^3/(48EI)$$
$$= \frac{165746}{x_3(x_1 - 2x_4)^3 + 2x_2x_4(4x_4^2 + 3x_1(x_1 - 2x_4))}$$

$$y_3 = \frac{M_1y_1}{I_1} + \frac{M_2y_2}{I_2}$$
$$= \frac{150000x_2}{(x_1 - 2x_4)x_3^3 + 2x_4x_2^3} + \frac{1800000x_1}{x_3(x_1 - 2x_4)^3 + 2x_2x_4(4x_4^2 + 3x_1(x_1 - 2x_4))}$$

The geometric constraints are:

40 cm $\leq x_1 \leq$ 80 cm, 30 cm $\leq x_2 \leq$ 50 cm, 0.9 cm $\leq x_3 \leq$ 5 cm, 2 cm $\leq x_4 \geq$ 5 cm.

Following the concept of constraint based reasoning, the specifications are acquired from customer's needs:

$y_1 \leq$ 400 cm$^2$; $y_2 \leq$ 0.06 cm; $y_3 \leq$ 124 Mpa.

As such, the performance equations can be linearized around the middle point of the control ranges:

$y_1 = -436.35 + 2.95x_1 + 7x_2 + 53x_3 + 74.1x_4$ (cm$^2$)

$y_2 = 0.265 - 0.002x_1 - 0.001x_2 - 0.0025x_3 - 0.0106x_4$ (cm)

$y_3 = 191.689 - 0.75x_1 - 1.407x_2 - 1.689x_3 - 10.71x_4$ (Mpa)

With the above functions, the design representation for the beam design is established in FIG. 8.

Figure 10:
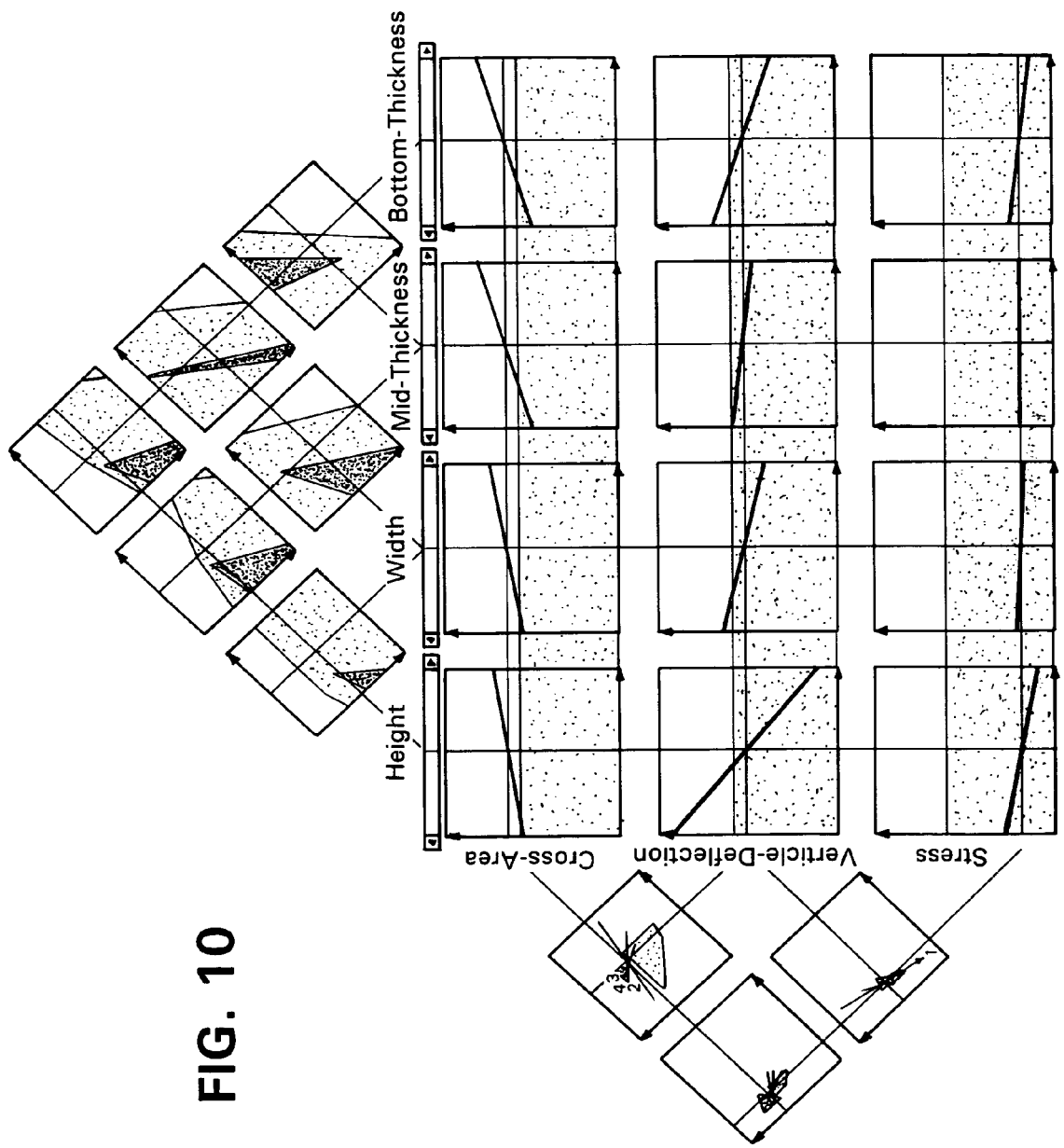
FIG. 10 is a graphical representation of the display of FIG. 1 with graphs corresponding to the application discussed in connection with FIG. 9.
Figure 11:
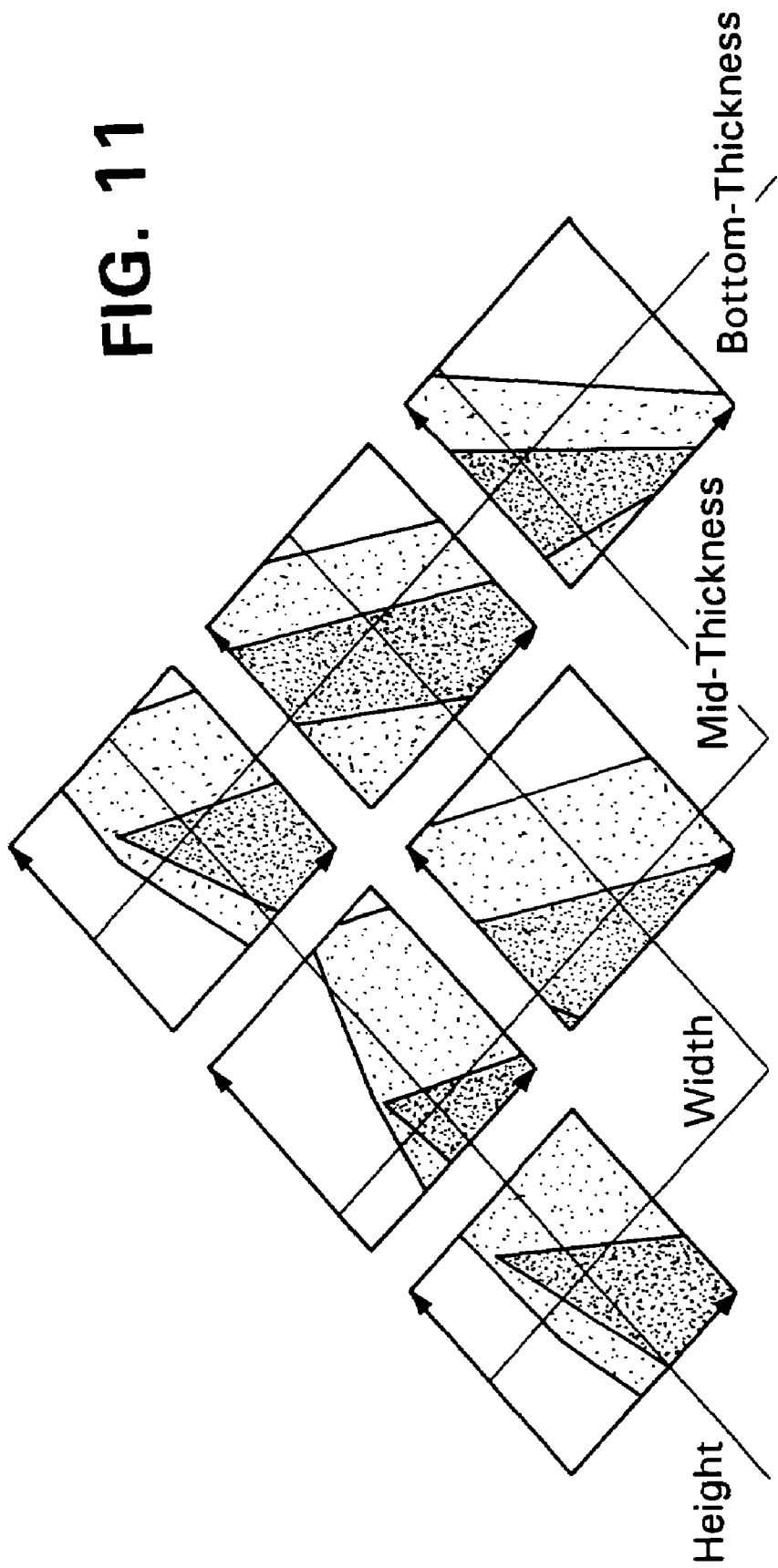
FIG. 11 is a graphical representation of several two-dimensional design subspaces corresponding to feasible designs of the beam in FIG. 9.

The initial design, arbitrarily set at the middle point $X^0 = (60, 40, 2.95, 3.500)^T$, is infeasible as indicated by its location outside of the local decision space (identified as the darker regions) shown in FIG. 10. It is trivial to acquire a feasible solution by observing the local decision space and adjusting any of the parameters into the feasible region. While there are many options to achieve the feasible space, the designer, for the sake of argument, is assumed to decrease $x_3$ and increase $x_1$. Then the design vector becomes $X^1 = (64, 40, 1.72, 3.50)^T$. The local decision space is updated in FIG. 11. All the design parameters are now inside the updated local decision space. Note that the global decision space has not changed.

Given the feasible design vector, the next step is to improve unsatisfactory performance attributes within the specification. There are basically two strategies to maximize the multiple performance attributes. The compensating trade-off approach allows the higher performing attributes to compensate for lower performing attributes, and the non-compensating trade-off approach intends to improve the weakest performance attribute. Both approaches can iteratively find their ideal points in the performance space.

Figure 12:
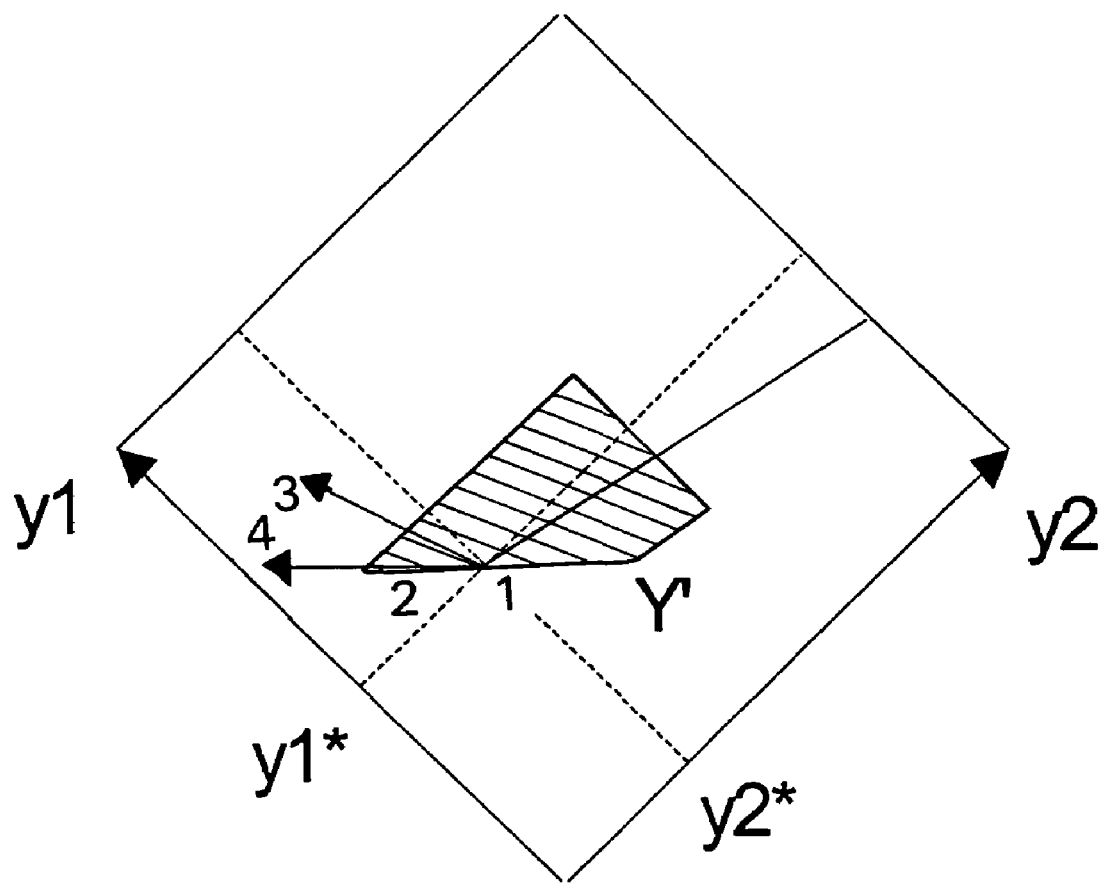
FIG. 12 is a graphical representation of design sensitivities for the beam design example of FIG. 9.

Without loss of generality, suppose the designer selects the compensating trade-off approach. One example is shown in FIG. 12. The current design vector $X^* = (80, 39.4, 0.9, 2.57)^T$, acquired after a few steps from the first infeasible vector, gives the performance $Y^* = (313.6, 0.028, 47.2)^T$. The figure reveals that $X^*$ is a noninferior solution. Nevertheless, other noninferior solutions also exist according to different preferences on the performance attributes. Also, the design sensitivities in FIG. 12 illustrate that the noninferior trade-off between the cross-section area, $y_1$ and the vertical deflection, $y_2$ can be obtained by adjusting the width $x_2$ or the bottom-thickness $x_4$. For the sake of argument, it is assumed that the designer prefers a smaller area. Then the performance space leads the design vector to decrease $x_2$ and $x_4$ to $X' = (80, 30, 0.9, 2)^T$ and $Y' = (205.5, 0.045, 66.5)^T$. Similarly, the approach can be applied to each mutual space to acquire the desired overall performance.

Decision Based Design

The previous design strategy adopted a typical systematic approach in which the designer defines the performance attributes first, and then sets a specification for each attribute. Generally, these specification limits are selected by the designer without complete knowledge of the design problem. Although it is commonly used, such a design approach has been criticized as lacking a rational basis. The following example presents another formulation of the beam design, in which final decision attributes (profit and risk) replace the performance attributes (area, deflection and stress). Thus, the design objective is to maximize the profit of the beam application and minimize the risk of product failure.

Figure 13:
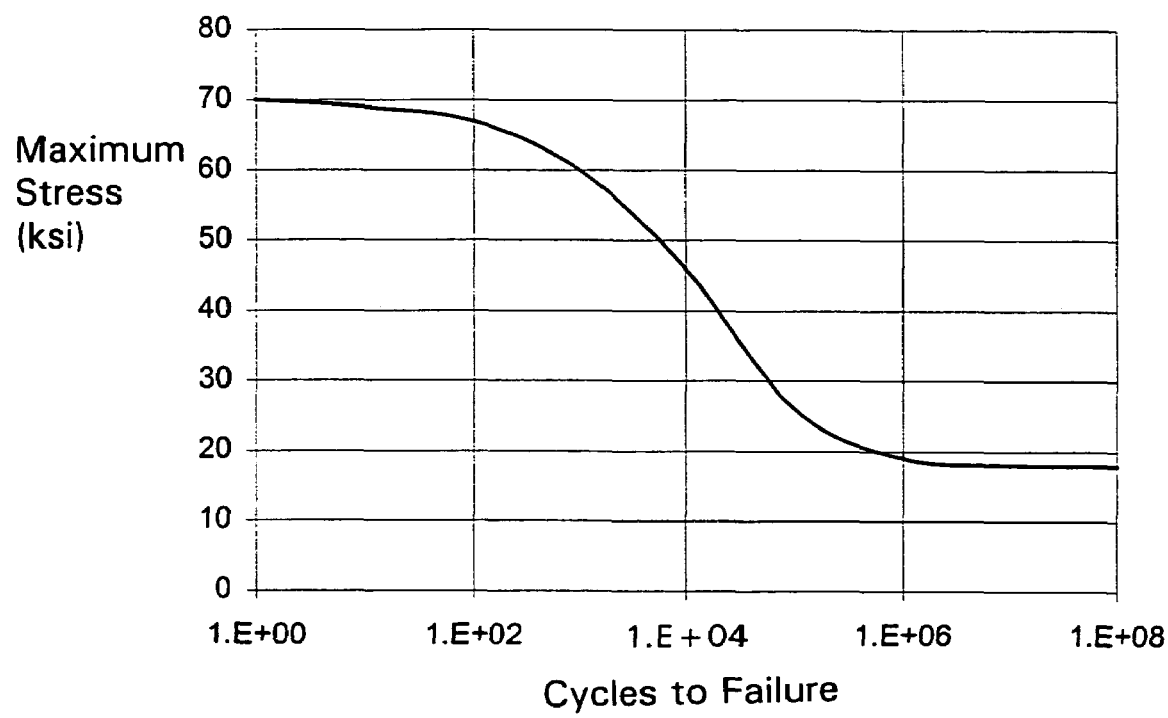
FIG. 13 is a graphical representation showing an example of the fatigue quality of the material used to make the beam shown in FIG. 9.

Assuming that the beam structure includes some submicroscopic cracks, the fatigue quality of the material is shown in FIG. 13.

According to fracture mechanics, the risk R or the failure probability F(V) of the material with volume V can be calculated by the Weibull equation:

$$1 - F(V) = \exp[-V/V_0(\sigma_{max}/\sigma_0)^m],$$

in which F(k) is the accumulated failure probability during the beam's life cycle, $V_0$ is the volume of the specimen, $\sigma_0$ is the tensile stress that causes 63% of the samples to fail, and m is the Weibull coefficient. In this case, the volume, tensile stress, and the Weibull coefficient are 600 cm$^2$, 34.5 kN/cm$^2$, and 10 respectively.

The profit is determined by the margin between the price and the basic cost. Generally, the Internal Rate of Return (IRR) is used to measure the earning profit.

$$IRR = (Price - C_{weight} - C_{life} - C_{manufacturing})/C_{basic},$$

in which $C_{weight}$ is the penalty cost of over-weight $\Delta_{weight}$, and $C_{life}$ is the fatigue cost corresponding to the life cycle $N_{cycles}$. Assume that:

$\Delta C_{weight} = 0.3 \Delta weight,$ $\Delta C_{life} = 2.579 \cdot 10^{-9} N_{cycles},$ $C_{manufacturing} = 2^{(\$/lb)} * 6 \cdot 125 \cdot 10^{-3(lb/cm3)} * Volume^{(cm3)},$ Price = 1.3 $C_{baic},$ in which $\Delta$ represents the percentage changes. The basic cost may be estimated with the design parameters around their middle points. Therefore, $C_{basic} = C_{manufacturing}(Area = 300) + C_{life}(N_{cycle} = 108) = \$925$ $IRR = [1200 - 0.37(Area - 300) - 6.31 \cdot 10^{-9} N_{cycle} Area - 2.45 Area]/925.$ The number of cycles to fail is calculated according to the curve fit of FIG. 13 as:

$$\text{Log}(N_{cycle})=3.879+0.894 \text{ Tan }[(305-\sigma_{max})140].$$

Combining the profit and risk equations with the area and stress equations formulated previously, the design's performance attributes are established in terms of the four design parameters. Similarly, a linearization is applied to the model:

$$\text{IRR}=3.05-0.011x_1-0.026x_2-0.198x_3-0.276x_4,$$

$$\text{Log [Risk]}=5.75-0.065x_1-0.12x_2-0.1x_3-0.897x_4$$

Figure 14:
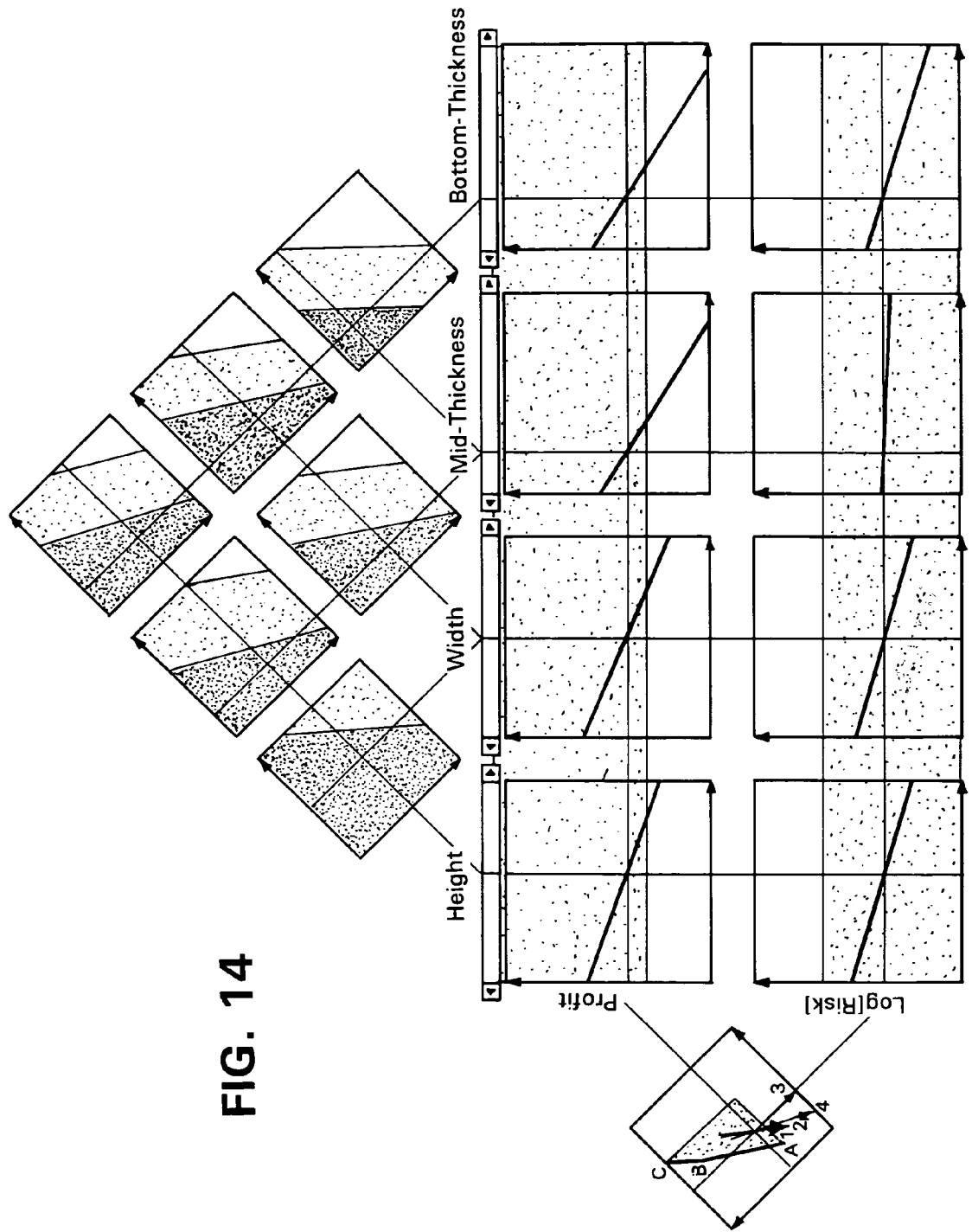
FIG. 14 is a graphical display for the example of FIG. 8 in which the performance attributes are risk and profit.

While the system of equations is non-linear, the linearization within the design regions significantly simplifies the generation of the feasible space. At the same time, the linear model fits the original non-linear problem very well in this specific problem. As such, the performance-based representation can be established as shown in FIG. 14. Noted that the risk is calculated using a logarithmic scale. The feasible space in FIG. 14 is generated with an expected profit larger than 10% and risk less than 0.1%.

The current design $X_0=(61.2, 40, 1.72, 2.75)^T$ represents a feasible decision alternative. Considering that an airplane consists of thousands of parts, the risk of failure should not be underestimated. The alternative $X_0$ produces a profit of 23% at 0.0002% risk. However, should the designer stop here?

The boundary ABC in the performance space constitutes the Pareto Optimal set. The extreme points A, B, and C respectively corresponds to three performance attributes (13%, 4·10$^{-8}$), (65%, 10$^{-5}$) and (98%, 0.099%). To maximize the profit and minimize the risk, any design alternative on ABC will be an "Optimal" solution. Since high reliability is expected for the airframe design, the designer is likely to select a solution closer to the point A. Utilizing the assistance of the performance space, a final design alternative may be selected as $X=(80, 44.4, 0.9, 2)^T$ with 27.6% profit and 2·10$^{-7}$ risk of failure during its 108 life cycles. Alternatively, if the main purpose of the design is to capture the maximum profit, the designer would probably choose a design with higher risks and higher profits.

Figure 15:
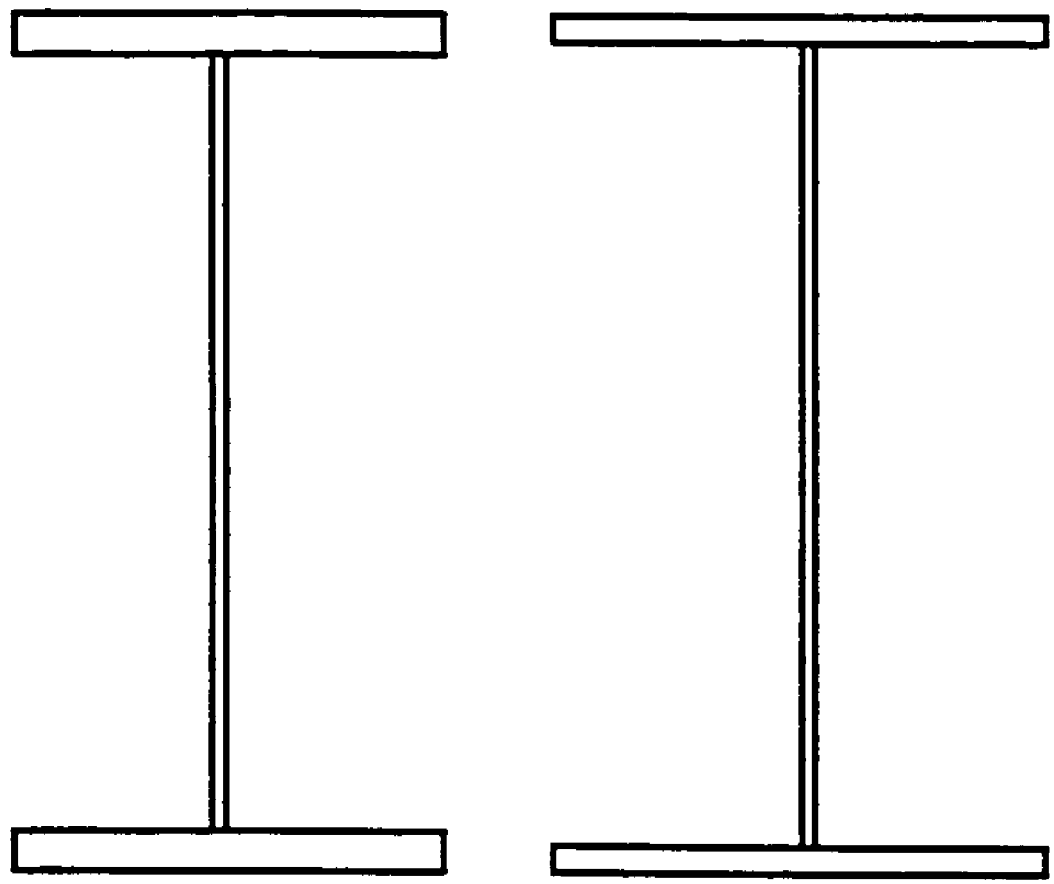
FIG. 15 is a schematic representation of an I-beam designed by constraint-based reasoning and decision-based reasoning.

FIG. 15 provides a comparison of a beam designed by the constraint based reasoning and a beam designed by the decision based approach. Note that the design solution in FIG. 15 is only one element of the Pareto Optimal set for each of the two approaches. The design chosen by the designer depends on how the designer chooses to trade-off of multiple attributes.

The introduction of a pair-wise decision space and performance space representation as provided by the system of the invention is a beneficial tool in the interactive design process because of its potential to facilitate other design methodologies. For instance, utility has widely been used to select the highest-ranking solution among the design alternatives. To rank multiple aspects of the design alternatives, utility functions can be applied to the performance attributes to quantitatively evaluate the design according to the specifications. However, it is difficult to combine all performance attributes into one overall function and to obtain a single score for each set of design alternatives. In addition, it is always questionable to casually combine the subjective and non-commensurable attributes. Instead of determining a solution, the performance-based representation of the invention explicitly catalogs the feasible set of design alternatives and leaves the final decision to the designer. As an extension, the performance attributes in the representation can be wrapped with a utility function to establish the utility space. This utility space, composed of the pair-wise comparisons of single attribute utility, provides a panoramic view on the overall utility value. With the assistance of the decision space and the utility space, the designer can interactively make the decision regardless of utility independence of multiple attributes.

The representation is described above in the context of a deterministic design problem. The ideal design vector is likely to be a non-inferior solution located in the boundary of the performance space to maximize the likelihood of certain performance attributes. However, given the probabilistic distributions for the design parameters and functional relations, the performance attributes will exhibit variations. Consider the robust design as a two-step design: 1) bring the mean of the design parameters to the target; 2) minimize the variation of performance attributes at this target. Then, robust design can be cast as an interactive process to find the reliable design vector with good performance attributes in the performance-based representation. Without any extension of the current representation, the center point of the feasible region can be considered as a robust solution that is less likely to exceed the specification limits under the unexpected noise. Moreover, the performance-based representation can simultaneously consider the robustness (the relative distance between the point designated by the design vector and the boundary of the feasible space) and the performance (the absolute value of the performance attributes). As such, the designer can adjust the distance of the design vector from the non-inferior boundary in the performance space to acquire the trade-off between the performance and robustness.

The representation provided by a system according to the invention also facilitates the evaluation of different conceptual designs. Conceptual design is one of the most important but one of the least understood stages of the design process. In standard practice, the current subjective evaluation of the design configurations often leads the designer into unnecessary iterations. The performance-based representation of the invention provides a graphical and quantitative evaluation method that reflects the functional relationship between the design parameters and the performance attributes. While the number of and functional relations between design parameters varies with each concept topology, the specified performance attributes are typically identical. By establishing the performance space for each design configuration, the designer can gain the understanding of the important aspects of the design alternatives. Although not all parameters are clear at the stage of conceptual design, the described representation embedded with the major performance attributes and critical design parameters will lead the designer to the best design configuration.

A performance-based representation as described herein aids the designer throughout the design process. Based on the convexity of the linear problem, the decision space is solved by iteratively clipping the hyperplane of the performance specification space. The performance space is the functional mapping of the extreme points of the decision space. The performance-based representation currently utilizes the pair-wise two-dimensional space to envision the multi-dimensional decision space and the multi-dimensional performance space. Such a performance based representation evaluates the feasibility of the design solution, achieves the feasible solutions, and eventually leads the designer to a desired trade-off of multiple attributes. As taught by the specification of cost and risk as performance attributes, the system of the invention can be used in decision making problems other than in engineering design.

The invention can be implemented in hardware or software, or a combination of both. The invention can be implemented in computer programs using standard programming techniques following the method steps and figures described herein. The programs should be designed to execute on programmable computers each comprising a processor, a data storage system (including memory and/or storage elements), at least one input device, and at least one output device, such as a CRT or printer. Program code is applied to input data to perform the functions described herein and generate output information. The output information is applied to one or more output devices such as a CRT, as described herein.

Each program is preferably implemented in a high level procedural or object oriented programming language to communicate with a computer system. However, the programs can be implemented in assembly or machine language, if desired. In any case, the language can be a compiled or interpreted language.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

The computer-implemented display system can be implemented in hardware, using, for example, an application-specific integrated circuit, in software, or any combination of hardware and software. Instructions for executing the system can reside on software stored on a computer-readable medium. Examples of such computer-readable media include random access memory including read-only memory, optical disks, magnetic disks, magnetic tape, punched cards, and punched paper tape. The instructions can be executed on a general purpose digital computer having a processor, a keyboard and/or mouse for communicating with a designer, and an output device, such as a video display monitor. However, in the absence of a video display monitor, the computer-implemented display embodying the principles of the invention can be output on a printer. The general purpose digital computer also typically includes access to a storage element, such as a computer-readable medium, in which software instructions for implementing the display system are stored pending execution by the processor. Such a storage element can be a hard or floppy drive for reading disks, a magnetic tape reader, or a CD-ROM reader. The components of the general purpose digital computer can be connected locally or distributed over a network. For example, the processor can be on a remote server and the display can be local to the designer.

Other Embodiments

The computer-implemented display system of the invention can be applied to the solution of all design problems in which a large number of design variables affect a large number of performance attributes. Such design problems permeate the modern world. For example, in the world of financial analysis, one is frequently called upon to select design variables (e.g. a ratio of stocks to cash, selection of particular stocks, bonds, commodities) to achieve certain performance attributes (e.g. desired net worth upon retirement, expected risk, desired rate of return). In the transportation industry, the selection of airline or bus routes is one in which design variables, (e.g. cargo capacity, passenger capacity, arrival and departure times) are manipulated in order to control performance attributes (expected delay, revenue, fuel costs, labor costs, weather related risks). In the chemical processing industry, design attributes such as reactant concentrations, reaction temperatures, and catalyst quantities are manipulated to achieve performance attributes such as concentration of product, costs of reactants, fuel costs, and risk of plant failure. These and other applications of the computer-implemented display of the invention are within the scope of the claims that follow.

While the foregoing description describes one embodiment of the invention, it is by no means the only such embodiment. Instead, the scope of the invention is defined by the accompanying claims.

What we claim as new and secured by Letters Patent is:

1. A computer-implemented display system for visualizing the effect of selected values of a plurality of design variables on a plurality of performance attributes, said display system comprising:
   a processor having an input for accepting instructions and an output for driving a visual display;
   a plurality of control graphs generated on said display using said output of said processor, said control graphs showing relationships between said design variables and said performance attributes;
   a plurality of performance graphs generated on said display using said output of said processor, said performance graphs showing relationships between said performance attributes;
   a plurality of decision graphs generated on said display using said output of said processor, said decision graphs showing relationships between said design variables; and
   a design-interface coupled to said input of said processor, said design-interface enabling a user to manipulate said design variables,
   wherein manipulation of said design variables causes display of an effect of said manipulation on said performance attributes, and display of a functional relationship between performance attributes.

2. The computer-implemented display system of claim 1 wherein said design-interface is a graphical user-interface.

3. The computer-implemented display system of claim 2 wherein said graphical user-interface comprises a scroll-bar having a user-adjustable slider and a value of said first design variable changes in response to movement of said adjustable slider.

4. The computer-implemented display system of claim 1 wherein said design-interface comprises a field into which a designer enters a value for said first design variable.

5. The computer-implemented display system of claim 1 wherein said first design variable is a random variable and said design-interface enables a designer to specify a probability distribution of said first design variable.

6. The computer-implemented display system of claim 1 further comprising a specification-interface coupled to said plurality of performance graphs, said specification-interface enabling a designer to specify a range of permissible values for said first performance attribute.

7. The computer-implemented display system of claim 6 wherein said specification-interface further comprises a designer-preference interface for enabling a designer to assign a weight to said first performance attribute, thereby indicating an importance of said first performance attribute relative to said second performance attribute.

8. The computer-implemented display system of claim 6 wherein said first performance attribute is a random variable and said specification-interface enables a user to specify a probability distribution associated with said first performance attribute.

9. The computer-implemented display system of claim 1 wherein said plurality of control graphs is disposed in an array.

10. The computer-implemented display system of claim 9 wherein said array is a rectangular array of rows and columns, each row being associated with a performance attribute and each column being associated with a design variable.

11. The computer-implemented display system of claim 1 wherein said at least one control graph displays an indication of allowable values of said first design variable.

12. The computer-implemented display system of claim 1 wherein said at least one performance graph depicts a region of permissible values for said first and second performance attributes.

13. The computer-implemented display system of claim 12 wherein said region has a boundary representative of a Pareto optimal set of permissible values of said first and second performance attributes.

14. A method of visualizing the effect of selected values of a plurality of design variables on a plurality of performance attributes, said method comprising:
   displaying a plurality of control graphs, at least one of said control graphs illustrating an effect of a first design variable on a first performance attribute;
   displaying a plurality of performance graphs, at least one of said performance graphs showing a relationship between said first performance attribute and a second performance attribute;
   displaying a plurality of decision graphs, at least one of said decision graphs showing a relationship between said first design variable and a second design variable;
   manipulating said first design variable to control said first performance attribute; and
   updating said at least one performance graph and said at least one decision graph in response to said manipulation of said first design variable.

15. The method of claim 14 wherein said manipulating said first design variable comprises manipulating an element of a graphical user-interface.

16. The method of claim 15 wherein said manipulating an element of a graphical user-interface comprises sliding a user-adjustable slider on a scroll-bar.

17. The method of claim 14 wherein said manipulating said design variable comprises entering a value for said first design variable in a text field.

18. The method of claim 14 wherein said manipulating said first design variable comprises specifying a probability distribution of said first design variable.

19. The method of claim 14 further comprising specifying a range of permissible values for said first performance attribute.

20. The method of claim 14 further comprising assigning a weight to said first performance attribute, thereby indicating an importance of said selected performance attribute relative to said second performance attribute.

21. The method of claim 19 further comprising specifying a probability distribution associated with said first performance attribute.

22. The method of claim 14 further comprising disposing said plurality of control graphs in an array.

23. The method of claim 14 further comprising disposing said plurality of control graphs in a rectangular array of rows and columns, each row being associated with a performance attribute and each column being associated with a design variable.

24. The method of claim 14 further comprising displaying, on said at least one control graph, an indication of allowable values of said first design variable.

25. The method of claim 14 further comprising displaying, on said at least one performance graph, a region of permissible values for said first and second performance attributes.

26. The method of claim 14 further comprising displaying, on said at least one performance graph, a region of permissible values for said first and second performance attributes, said region having a boundary representative of a Pareto optimal set of permissible values of said first and second performance attributes.

27. A computer-readable medium having encoded thereon software for visualizing the effect of selected values of a plurality of design variables on a plurality of performance attributes, said software comprising instructions for:
   displaying a plurality of control graphs, at least one of said control graphs illustrating an effect of a first design variable on a first performance attribute;
   displaying a plurality of performance graphs, at least one of said performance graphs showing a relationship between said first performance attribute and a second performance attribute;
   displaying a plurality of decision graphs, at least one of said decision graphs showing a relationship between said first design variable and a second design variable;
   manipulating said first design variable to control said first performance attribute; and
   updating said at least one performance graph and said at least one decision graph in response to said manipulation of said first design variable.

28. The computer-readable medium of claim 27 wherein said instructions for manipulating said first design variable comprise instructions for manipulating an element of a graphical user-interface.

29. The computer-readable medium of claim 28 wherein said instructions for manipulating an element of a graphical user-interface comprise instructions for sliding a user-adjustable slider on a scroll-bar.

30. The computer-readable medium of claim 27 wherein said instructions for manipulating said design variable comprise instructions for entering a value for said first design variable in a text field.

31. The computer-readable medium of claim 27 wherein said instructions for manipulating said first design variable comprise instructions specifying, a probability distribution of said first design variable.

32. The computer-readable medium of claim 27 wherein said software further comprises instructions for specifying, a range of permissible values for said first performance attribute.

33. The computer-readable medium of claim 27 wherein said software further comprises instructions for assigning a weight to said first performance attribute, thereby indicating an importance of said selected performance attribute relative to said second performance attribute.

34. The computer-readable medium of claim 32 wherein said software further comprises instructions for specifying a probability distribution associated with said first performance attribute.

35. The computer-readable medium of claim 27 wherein said software further comprises instructions for disposing said plurality of control graphs in an array.

36. The computer-readable medium of claim 27 wherein said software further comprises instructions for disposing said plurality of control graphs in a rectangular array of rows and columns, each row being associated with a performance attribute and each column being associated with a design variable.

37. The computer-readable medium of claim 27 wherein said software further comprises instructions for displaying, on said at least one control graph, an indication of allowable values of said first design variable.

38. The computer-readable medium of claim 27 wherein said software further comprises instructions for displaying, on said at least one performance graph, a region of permissible values for said first and second performance attributes.

39. The computer-readable medium of claim 27 further comprising instructions for displaying, on said at least one performance graph, a region of permissible values for said first and second performance attributes, said region having a boundary representative of a Pareto optimal set of permissible values of said first and second performance attributes.

* * * * *